(12) United States Patent
Welch

(10) Patent No.: US 10,722,052 B2
(45) Date of Patent: Jul. 28, 2020

(54) ARTICULATING VANITY MIRROR ASSEMBLY

(71) Applicant: Daniel Garret Welch, Roseville, CA (US)

(72) Inventor: Daniel Garret Welch, Roseville, CA (US)

( * ) Notice: Subject to any disclaimer, the term of this patent is extended or adjusted under 35 U.S.C. 154(b) by 122 days.

(21) Appl. No.: 15/872,119

(22) Filed: Jan. 16, 2018

(65) Prior Publication Data

US 2018/0199737 A1    Jul. 19, 2018

Related U.S. Application Data

(60) Provisional application No. 62/499,160, filed on Jan. 16, 2017.

(51) Int. Cl.
| | |
|---|---|
| *G02B 5/08* | (2006.01) |
| *A47G 1/24* | (2006.01) |
| *A45D 42/18* | (2006.01) |
| *A47G 1/04* | (2006.01) |
| *A47G 1/16* | (2006.01) |
| *G02B 7/182* | (2006.01) |

(52) U.S. Cl.
CPC ............ *A47G 1/24* (2013.01); *A45D 42/18* (2013.01); *A47G 1/04* (2013.01); *A47G 1/1686* (2013.01); *G02B 7/1824* (2013.01); *A47G 2200/106* (2013.01)

(58) Field of Classification Search
CPC ........ G02B 7/1824; A45D 42/08; A47G 1/04; A47G 1/24

USPC ........ 248/486, 480; 359/850, 854, 855, 857, 359/872

See application file for complete search history.

(56) References Cited

U.S. PATENT DOCUMENTS

| | | | |
|---|---|---|---|
| 84,943 A | 12/1868 | Furber | |
| 115,898 A | 6/1871 | Roberts | |
| 393,679 A | 11/1888 | Wiederer | |
| 500,310 A | 6/1893 | Willard | |
| 1,031,075 A | 7/1912 | Lundin | |
| 2,763,186 A * | 9/1956 | Barlow | ............... A47G 1/04 359/854 |

(Continued)

FOREIGN PATENT DOCUMENTS

| | | | |
|---|---|---|---|
| FR | 470465 | 9/1914 | |
| WO | WO 2011/062482 | 5/2011 | |
| WO | WO-2011062482 A2 * | 5/2011 | ............. A47G 1/04 |

*Primary Examiner* — Todd M Epps
(74) *Attorney, Agent, or Firm* — Heisler & Associates

(57) ABSTRACT

A first center mirror and a second mirror are each suspended from a main bracket. The second mirror is pivotally connected to a bar which pivotally attaches to the main bracket and also to the second mirror. A third mirror is optionally pivotally connected to an arm pivotally attached to the main bracket. The first mirror is also preferably pivotally attached to an arm which is itself pivotally attached to the main bracket. An adjustably positionable top mirror can also be mounted to the main bracket. A close-up auxiliary mirror can be suspended from one of the other mirrors. Bushings support the arms upon the main bracket and support the mirrors upon the arms, with the bushings including a detent system to hold the mirrors in predefined positions. A person can stand multiple places and have mirrors positioned about the person for viewing different sides at each place.

17 Claims, 6 Drawing Sheets

(56) References Cited

U.S. PATENT DOCUMENTS

| | | | |
|---|---|---|---|
| 4,396,249 A | 8/1983 | Aisley | |
| 4,775,231 A * | 10/1988 | Granzow | A47G 1/04 359/854 |
| D330,807 S | 11/1992 | Granzow | |
| 5,642,236 A | 6/1997 | Mazurek | |
| 6,305,809 B1 | 10/2001 | Zadro | |
| 6,565,220 B1 | 5/2003 | Hayward | |
| 9,901,193 B2 * | 2/2018 | Nikolov | A47G 1/04 |
| 2005/0174662 A1 | 8/2005 | Cozad | |
| 2011/0031854 A1 | 2/2011 | Schwartz | |
| 2016/0051034 A1 | 2/2016 | Nikolov et al. | |

* cited by examiner

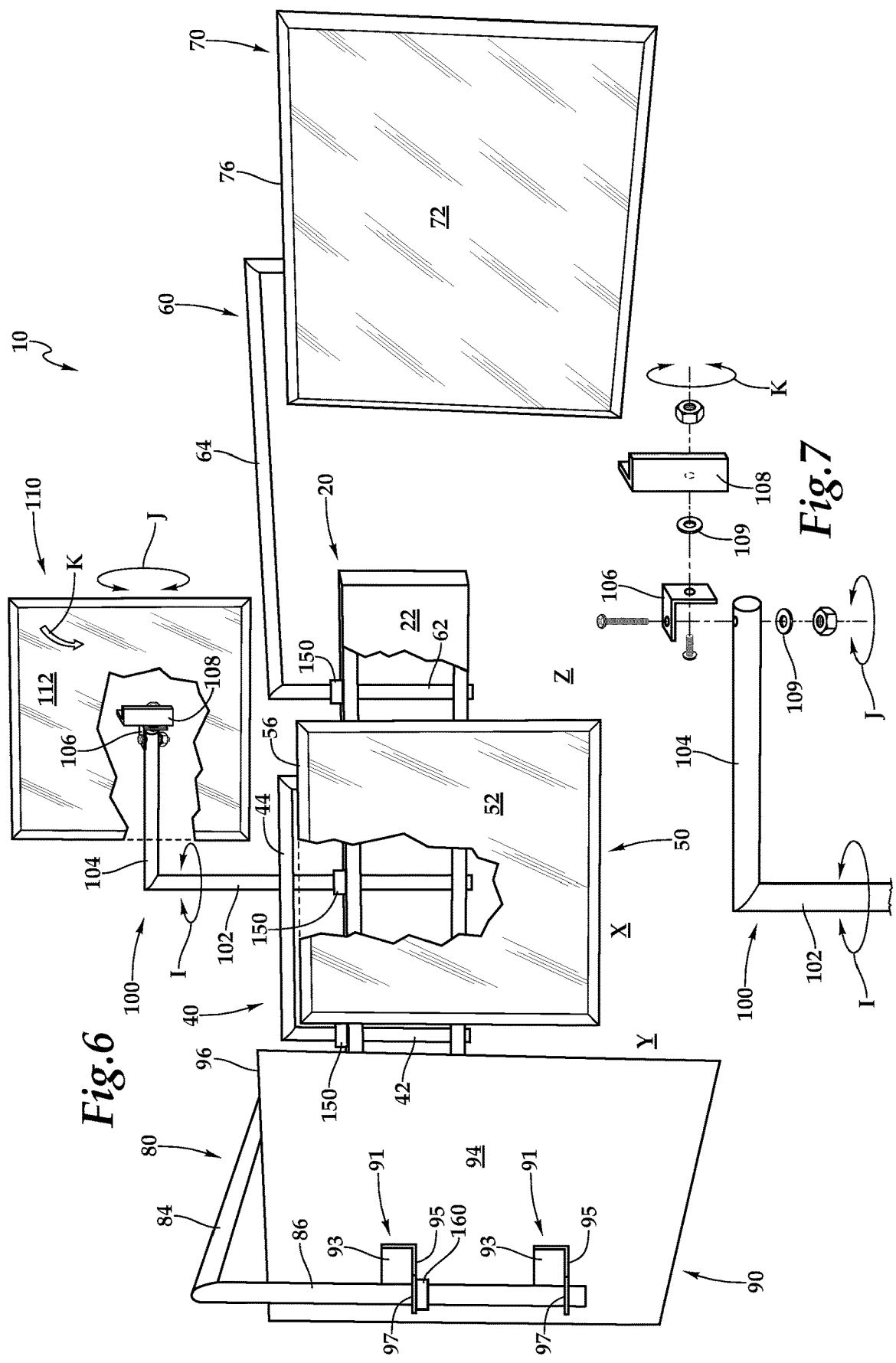

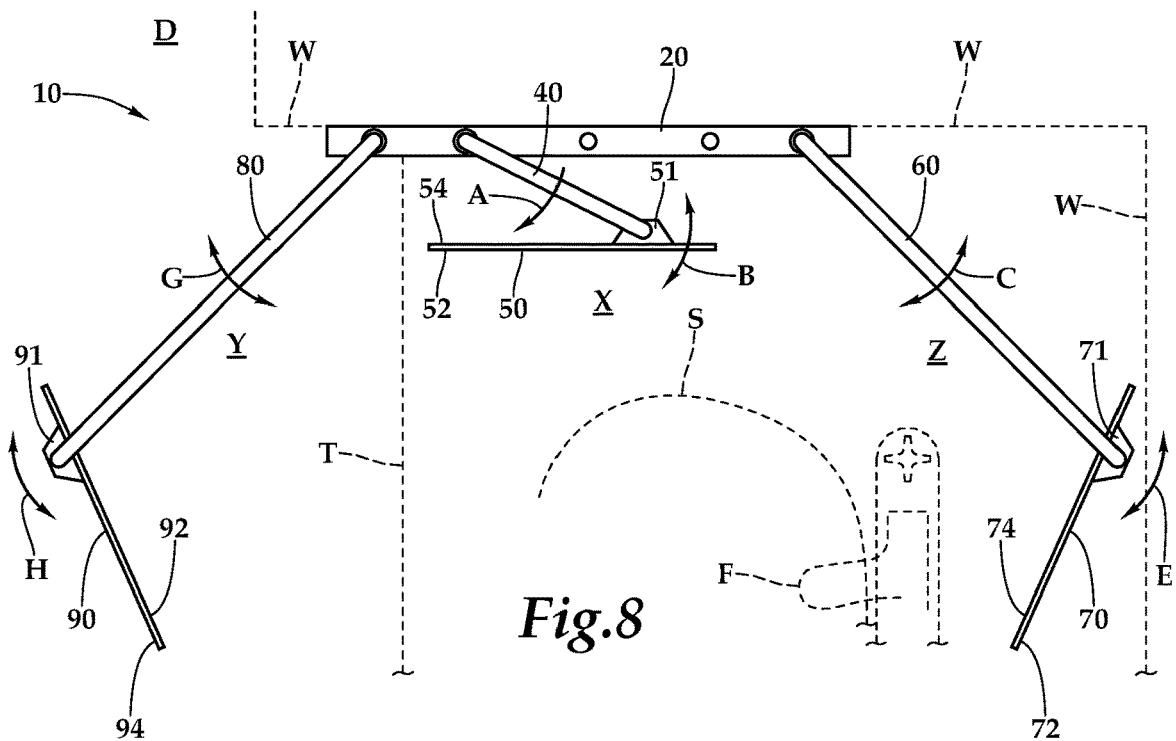
*Fig.8*
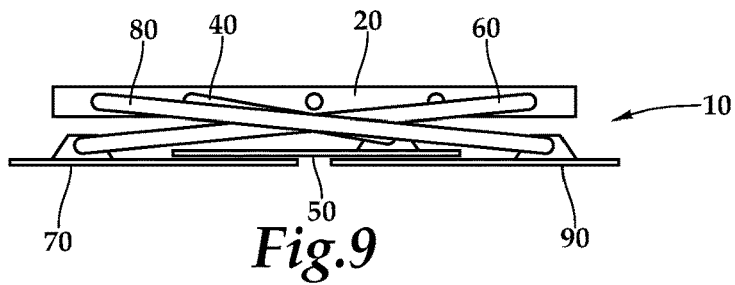
*Fig.9*
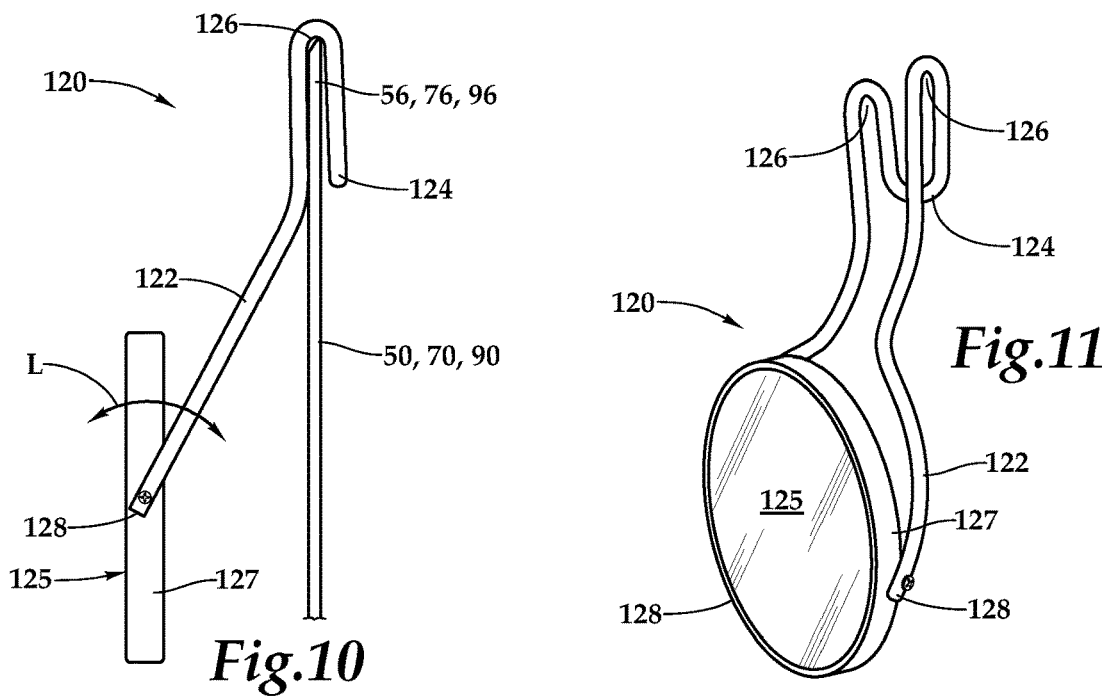
*Fig.10*          *Fig.11*

ARTICULATING VANITY MIRROR ASSEMBLY

CROSS-REFERENCE TO RELATED APPLICATIONS

This application claims benefit under Title 35, United States Code § 119(e) of U.S. Provisional Application No. 62/499,160 filed on Jan. 16, 2017.

FIELD OF THE INVENTION

The following invention relates to multiple mirror assemblies such as vanity mirror assemblies for viewing multiple different sides of a person. More particularly, this invention relates to multiple mirror assemblies which articulate into a variety of different positions with the mirrors suspended so that they avoid interfering with the person using the mirrors.

BACKGROUND OF THE INVENTION

Vanity mirrors come in a wide variety of sizes and shapes. Some such mirrors mount to walls, while others can be hand-held or are supported upon pedestals or other support structures, including standing up on the floor. Single mirrors, regardless of their size, only allow for one side of a person to be viewed, the front side. Curved mirrors provide a distorted image of the person. Thus, a typical solution for allowing a person to view multiple sides of the person, such as for inspecting clothing, styling hair, or other related purposes requires a multiple mirror assembly.

Most common multiple mirror assemblies involve vertical mirrors mounted with a center mirror and at least one side wing mirror angled relative to the center mirror, but also in a vertical plane. Such multiple mirrors allow for front and sides of an individual to be viewed. Another common prior art technique is to utilize a fixed large vanity mirror along with a small hand-held mirror. Either the hand-held mirror is located facing an area to be viewed or the large fixed mirror is used for viewing a desired location by orienting the desired location of the individual facing the fixed mirror, and then utilizing a hand-held mirror opposite the fixed mirror and facing the user's eyes, so that the reflection from the area to be viewed, against the fixed mirror, and then against the hand-held mirror and then to the eyes of the individual can be utilized for such viewing.

While the combination hand-held mirror and fixed mirror strategy is somewhat effective, it has multiple drawbacks. The hand-held mirror must be held by the user, so that one hand of the user is not available for other functions, such as hairstyling procedures. Furthermore, the hand-held mirror is either quite small, undesirably heavy or unsteady, so that an area being viewed is limited in size or the user has energy taxed unacceptably.

Some rooms are provided with mirrors on opposite walls. However, because these walls are perfectly parallel to each other, and an individual is always exactly between lines perpendicular between these mirrors and eyes of the user, the user's head is always in the way, blocking viewing of a backside of the individual's head. Rather, what is needed is two mirrors which are almost parallel, but slightly off of parallel, so that a person can "see around" the person's head. Rooms do not conveniently come with opposing walls which are slightly off parallel. Furthermore, it is desirable to have some adjustment control in the positioning of mirrors, both to provide optimal spacing away from the individual, and to provide optimal angling of the mirrors, such as for viewing left rear and right rear sides of the head of the individual. Fixed opposing mirrors are not able to accommodate such control.

Some hinged mirrors have sufficient numbers of panels and sizes of reflective panels that they can have multiple panels spaced on nearly opposite sides of an individual. However, the hinged panels block passage of the individual on at least one side thereof, due to the intervening hinge panel between the two panels which can be positioned generally opposite each other. Thus, while many different mirror assemblies are found in the prior art, these prior art assemblies have various drawbacks which benefit from a mirror assembly avoiding these deficiencies.

Many bathroom locations in modern residential structures, hotels, dressing rooms and similar locations are provided with a sink located within a countertop and with a mirror on a wall on the side of the sink and countertop opposite where an individual can easily stand (or sit). Such rooms typically have only limited space available for mounting of mirrors and mirror assemblies. One area that is generally available is on a wall on a lateral side of such a sink countertop and perpendicular to the main wall behind the sink and behind the countertop. However, the primary area in front of such a lateral wall space cannot be easily accessed by an individual because the countertop is there. An ideal place for an individual to stand is in front of the countertop, but typically the lateral wall stops short of this area. Accordingly, a need exists for a multiple mirror assembly which can pivot and articulate to desirably position mirrors on opposing sides of such a space, but which mirrors can be collapsed back into a stored location against such a lateral wall space when not in use.

Other problems with known prior art mirror assemblies include difficulty in holding the mirrors in desirable positions and the limited availability of mirrors for viewing a top of an individual's head, and concave close-up mirrors within such mirror assemblies. An ideal mirror assembly would provide support for such accessories to further allow for customization and usefulness of such a mirror assembly, and all without taking up any counter space, drawer space or hands of a user to position the mirrors where desired and hold the mirrors in this position.

SUMMARY OF THE INVENTION

With this invention, a mirror assembly is provided with a plurality of articulating mirrors all suspended from a common support base. The support base is provided in the form of a main bracket in a preferred embodiment herein. The support base provides for pivotable support for at least some of the multiple mirrors. A first mirror is provided, generally referred to as a center mirror, and which preferably is pivotally supported by the support base, but could be fixed to the support base or to a wall or other structure adjacent to the support base, as an alternative. A second mirror is provided which is shown in a preferred embodiment herein as a right mirror or a left mirror. In a most preferred embodiment, a third mirror is also provided, shown in the preferred embodiment as the left mirror or right mirror.

The second mirror and preferably also the third mirror are pivotally supported from the support base through an elongate rigid arm, referred to in the preferred embodiment as the right bar for the right mirror and the left bar for the left mirror. This elongate rigid bar suspends the second mirror so that it can be located opposed to the first mirror and generally facing the first mirror, and with an individual between the first mirror and the second mirror. The elongate rigid bar is preferably pivotally attached to the support base and also pivotally attached to the second mirror. This allows for the second mirror to be placed in a very large number of positions and orientations to best suit the needs of an individual.

The first mirror is also preferably pivotally supported upon a rigid arm, such as a center bar pivotally attached to the support base and also pivotally attached to the first mirror, so that the first mirror can also be oriented in a variety of different ways, and also positioned in different positions. With the further optional inclusion of the third mirror and further elongate rigid arm supporting the third mirror, still further flexibility is provided as to mirror position and orientation adjacent to various regions where an individual can be located. An individual can now easily see all sides of an individual's head and body in one or both of these second and third mirrors, used along with the first mirror within this mirror assembly.

The elongate rigid arms supporting the second (and optionally third) mirror preferably have an overhead portion in a middle thereof between the support base and the second mirror (or third mirror). This overhead portion is preferably above the support base and also above at least portions of the second mirror (or third mirror). An individual located between these mirrors will thus be able to freely stand under the overhead portion of the arm without bumping into the arm. Thus an individual has free movement beneath and at either side of the overhead portion of the arm for optimal positioning of the individual and mirrors, without needing to worry about bumping the individual's head or dodging the arms.

Most preferably, the elongate rigid arm associated with the second mirror and further elongate rigid arm associated with an optional third mirror have overhead portions which are elevated at different heights. This allows articulation of the second mirror and optional third mirror in a variety of different ways relative to each other without the bars or other arms associated with these mirrors bumping into each other. Furthermore, this allows the bars or other arms supporting the second mirror and optional third mirror to have a maximum length and be positioned crossing each other and collapse significantly into a storage position with the second and optional third mirrors adjacent to each other and directly in front of the first mirror when in a stored location, and taking up a minimal amount of space.

In a simplest form, the support base has holes oriented vertically passing therethrough for supporting arms in the form of bars. The main bracket or other support base can include a right hole, a left hole, a center hole, a right center hole between the right hole and the center hole, and a left center hole between the left hole and the center hole. Each of these holes is available to support an arm in the form of a center bar for the first center mirror and/or a right bar or left bar coupled to a second right/left or third left/right mirror. Furthermore, a top mirror can similarly be provided with a top bar which can fit within the center hole or other hole within the main bracket. Each of these bars or other arms extended vertically at an end adjacent to the main bracket, and then extend horizontally (or arched or in some other generally lateral fashion) to an opposite end where the bar is again extending downwardly and pivotally interfaces with an associated mirror (such as the center mirror, right mirror, left mirror), preferably in a pivoting fashion. With the case of the top bar, this bar preferably extends horizontally and then terminates at a pair of brackets including a swivel bracket and a pivoting bracket to allow for swiveling and pivoting of the top mirror and viewing of a top of a head of an individual.

The various bars or other arms have different heights so that they can articulate freely without bumping into each other. Bushings associated with each arm are removably fixable to vertical portions of each arm adjacent to the main bracket. Detent recesses in a top plate of the main bracket can cooperate with detent elements within the bushing, and with the bushing attached to the bar or other arm through an adjustable setscrew, to allow for final adjustment of height of the bars or other arms, and also to select a preferred detent location for each of the mirrors. An individual, taking into account space adjacent to a mounting location for the main bracket and desired positions for the various mirrors, can then loosen the bushings, rotate the bushings to have the detent structure on the bushing residing within the detent recess in the top plate of the main bracket, and then tighten the setscrew, so that this most desired location for each mirror can be quickly and easily found and maintained during future use. Magnets or other fasteners can be provided within the main bracket which help to hold the mirrors in a collapsed orientation when not in use.

In various embodiments, the main bracket can be provided mounted upon a freestanding plate extending up from a dresser or other item of furniture, such as where no wall surface is available for mounting of the main bracket or other support base. A close-up mirror can be provided which can be suspended over a top edge of one of the mirrors of the mirror assembly. This close-up mirror can include a concave reflector surface pivotally attached to a support arm so there an angle of the close-up mirror can be selected by a user. An individual is thus provided with a close-up mirror option, suspended from one of the mirrors of the mirror assembly if desired. The close-up mirror can be removable or affixed in a single preferred position. As one option, the close-up mirror can be affixed to a rear surface of one of the mirrors, either without pivoting adjustment or with pivoting adjustment.

OBJECTS OF THE INVENTION

Accordingly, a primary object of the present invention is to provide an articulating vanity mirror assembly which places multiple mirrors on opposite sides of a space where an individual can be located, for viewing different sides of the individual's head and body.

Another object of the present invention is to provide an articulating mirror assembly which has both a compact collapsed orientation and a deployed orientation with multiple mirrors that can be positioned in a variety of different locations and orientations about an individual's location, for optimal positioning for viewing different sides of the individual through the mirrors.

Another object of the present invention is to provide an articulating mirror assembly with multiple mirrors facing an individual's location and with mirror support arms located sufficiently high to allow the individual to freely move beneath such mirror support arms.

Another object of the present invention is to provide a multiple mirror assembly which includes both multiple vertical mirrors and a top mirror which can pivot downwardly for viewing a top of an individual's head.

Another object of the present invention is to provide a multiple mirror assembly which can be conveniently mounted through a single main bracket to a wall or upon a plate or other structure extending up from furniture, such as a dresser, or mountable to a door, either by being mounted or suspended.

Another object of the present invention is to provide a multiple mirror assembly which also includes a close-up mirror which can be suspended from one of the mirrors of the assembly and which includes a concave reflective surface.

Another object of the present invention is to provide a multiple mirror assembly which can be mounted at a first location on a wall above a countertop facing an area which is difficult to access, but with mirrors that can pivot to an adjacent area which is easy for an individual to access, and with the mirrors facing the individual when the mirrors are deployed.

Another object of the present invention is to provide a multiple mirror assembly with detents allowing the mirrors to be positioned in a most desired location easily in a repeatable fashion.

Another object to the present invention is to provide a method for viewing multiple different sides of an individual through a multiple mirror assembly.

Other further objects of the present invention will become apparent from a careful reading of the included drawing figures, the claims and detailed description of the invention.

BRIEF DESCRIPTION OF THE DRAWINGS

FIG. 6 is a perspective view of that which is shown in FIG. 1, and further showing a top mirror and associated top bar suspending the top mirror from the main bracket, and with portions of the front plate of the main bracket and portions of the mirrors cut away so that details of articulating suspension of the various members of the assembly can be seen.

FIG. 7 is a front elevation view showing a detail of the top bar for the top mirror, and with a swivel bracket and pivot bracket for supporting the top mirror in a manner which swivels and pivots, shown with associated fasteners exploded away from the top bar illustrating one assembly thereof.

FIG. 8 is a top plan view of that which is shown in FIG. 1, and with portions of a wall, doorway, countertop, sink and faucet shown in broken lines, illustrating how the mirror assembly of this invention can be mounted on a lateral wall area facing an inaccessible area for an individual, but can be positioned around an area accessible by an individual for use when the mirrors are deployed away from the main bracket.

FIG. 9 is a top plan view of that which is shown in FIG. 1, with the mirrors shown in a collapsed orientation against the main bracket.

FIG. 10 is a side elevation view of a close-up mirror suspended over a top edge of one of the mirrors of the mirror assembly.

FIG. 11 is a perspective view of the close-up mirror of FIG. 10, shown alone.

DESCRIPTION OF THE PREFERRED EMBODIMENT

Figure 12:
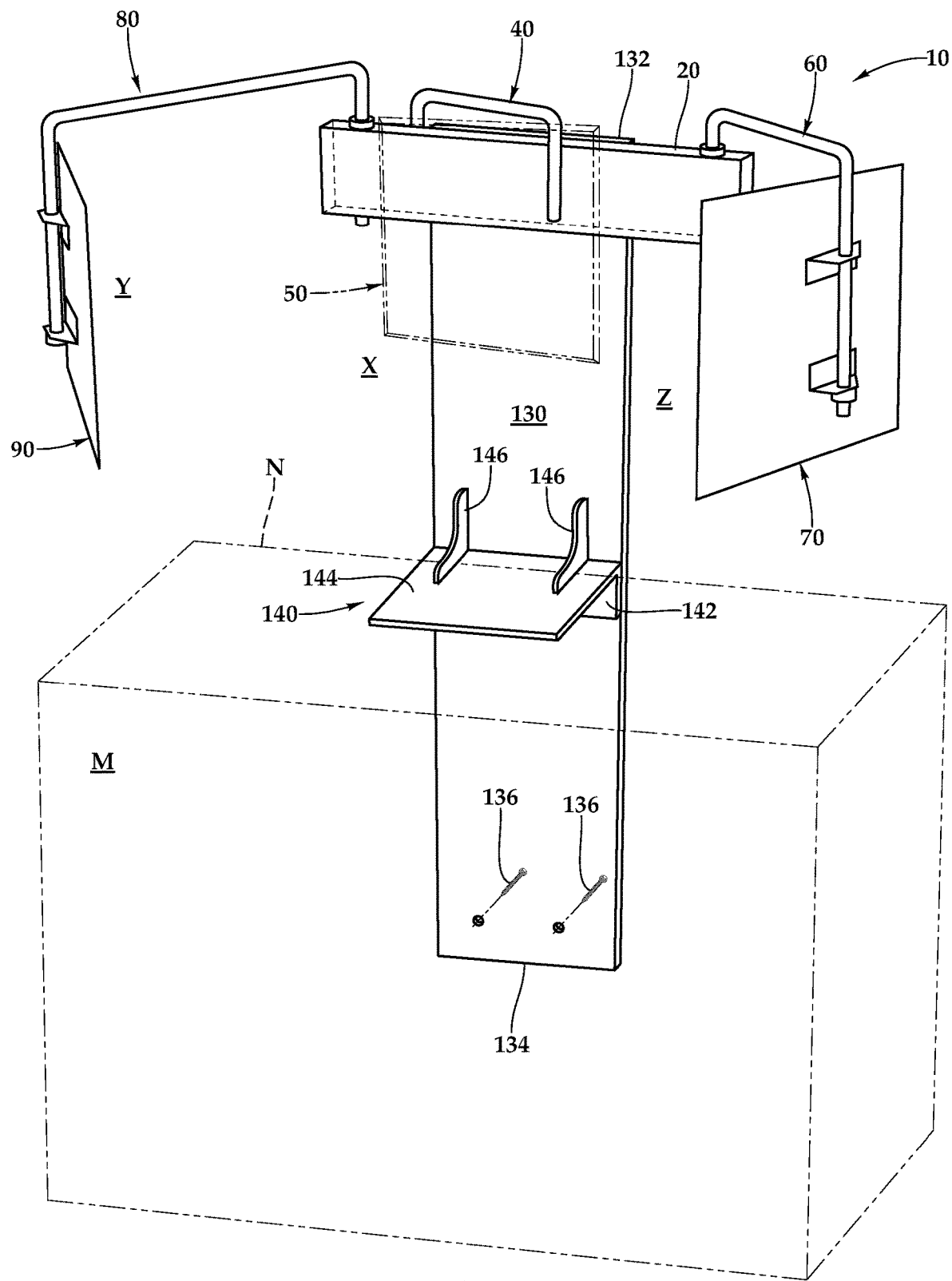
FIG. 12 is a perspective view of an embodiment of the mirror assembly where the main bracket is mounted to a freestanding plate and angle bracket coupled to a rear surface of a dresser and resting upon a top surface of the dresser or other furniture in one embodiment of this invention.

Referring to the drawings, wherein like reference numerals represent like parts throughout the various drawing figures, reference numeral 10 is directed to a mirror assembly including multiple mirrors 50, 70, 90, 110, 120 suspended therein (FIGS. 1, 6, 8 and 10) and articulating relative to a main bracket 20 as a preferred form of support base which can be mounted to a wall W or through a freestanding plate 130 to a dresser M or other item of furniture (FIG. 12). The mirror assembly 10 is particularly useful in providing pairs of mirrors 50, 70, 90 opposing each other and on opposite side of various regions X, Y, Z (FIGS. 1, 6, 8 and 10) where an individual can be located and utilize the pairs of mirrors 50, 70, 90, as well as optionally top mirror 110 (FIG. 6), for viewing the individual from various angles and on various different sides of the individual in a convenient manner.

In essence, and with particular reference to FIGS. 1, 2, 6, 8 and 9, basic details of the invention are described according to an exemplary embodiment. The mirror assembly 10 includes the main bracket 20 which is mountable to a wall W or to a freestanding plate 130 (FIG. 12) which, along with an angle bracket 140, allows the main bracket 20 to be suspended above a rear side N of an item of furniture M. The main bracket 20 acts as a preferred form of support base from which at least two mirrors are suspended, and typically at least three mirrors, including a center mirror 50, right mirror 70 and left mirror 90. An optional top mirror 110 can also be suspended from the main bracket 20.

Figure 1:
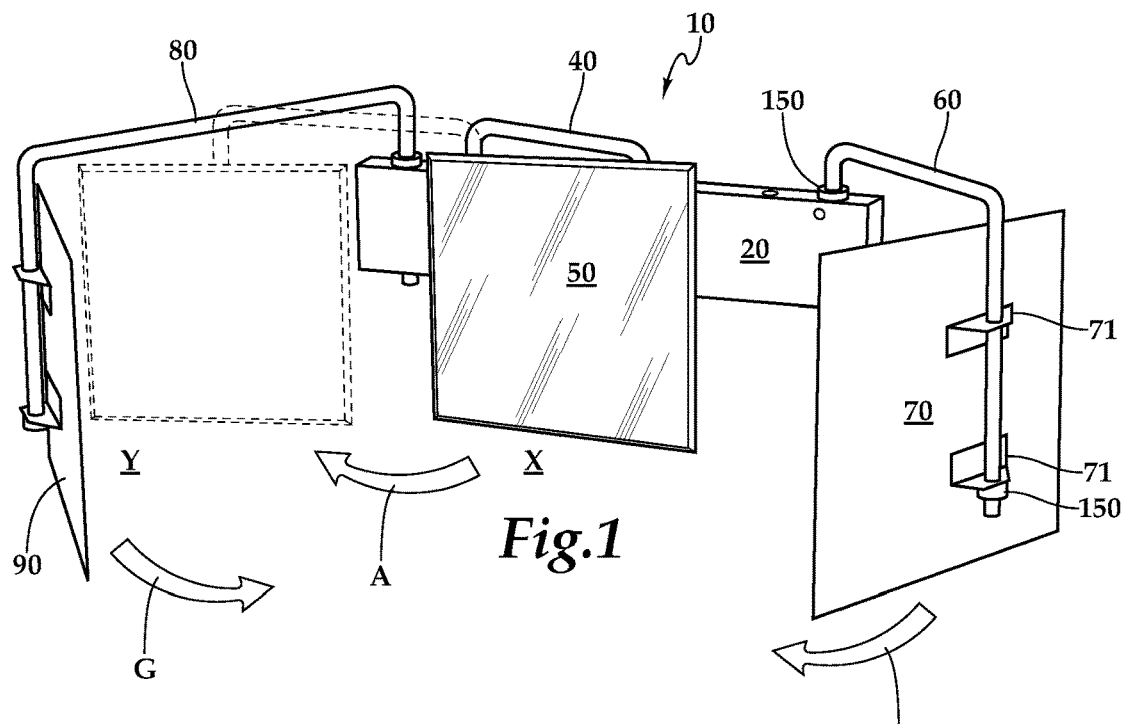
FIG. 1 is a perspective view of the articulating vanity mirror assembly of this invention, and with an alternate location to which a center mirror can be re-positioned shown in broken lines.

Such suspension of these mirrors 50, 70, 90, 110 occurs, in this exemplary embodiment, through bars including a center bar 40, right bar 60, left bar 80 and top bar 100, which define preferred forms of elongate rigid arms for mirror suspension. Optionally, the center mirror 50 can be mounted directly to the main bracket 20 or to the wall W (or plate 130 of FIG. 12) adjacent to the main bracket 20, but preferably the center mirror 50 is pivotally attached to the center bar 40 which is also pivotally attached to the main bracket 20. The center mirror 50 can thus be positioned in a variety of different locations and orientations relative to the main bracket 20 (FIGS. 1, 6 and 8). The right bar 60 pivotally attaches to the right mirror 70 and also pivotally attaches to the main bracket 20 to allow the right mirror 70 to be positioned and oriented in a variety of different positions. The left bar 80 pivotally attaches the left mirror 90 to the main bracket 20 with articulation between the left bar 80 and the left mirror 90 and also articulation between the left bar 80 and the main bracket 24, for positioning the left mirror 90 in a variety of different locations and orientations.

A top bar 100 pivotally attaches to the main bracket 20 and also has the top mirror 110 attached to the top bar 100 in a matter further allowing both swiveling within a vertical plane and pivoting out of a vertical plane, such as to facilitate viewing a top of a head of an individual standing in front of the main bracket 20 and partially below the top mirror 110. A close-up mirror 120 (FIGS. 10 and 11) provides one accessory option which can be suspended from one of the mirrors 50, 70, 90 and can also pivot for angling of a concave reflector associated with the close-up mirror 120. A bushing 150 is provided at a variety of locations on bars suspending the mirrors from the main bracket. These bushings define a position of the associated bars 40, 60, 80, 100 relative to the main bracket 20, and also preferably define a position of the mirrors 50, 70, 90 upon the bars 40, 60, 80.

Figure 3:
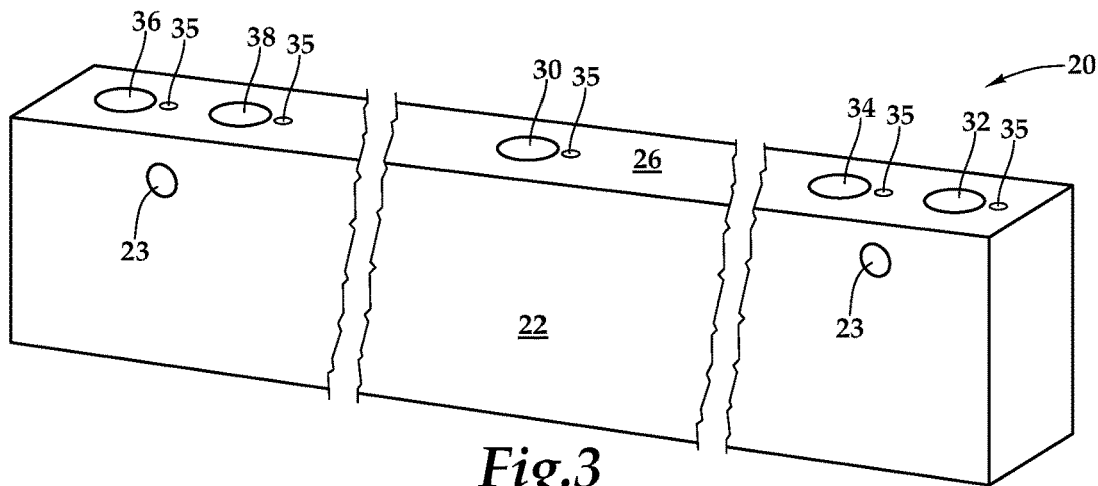
FIG. 3 is a perspective view of the main bracket as one embodiment of a support base for the mirror assembly of this invention, and with intermediate portions cut away to allow enlargement of remaining portions of the bracket.
Figure 4:
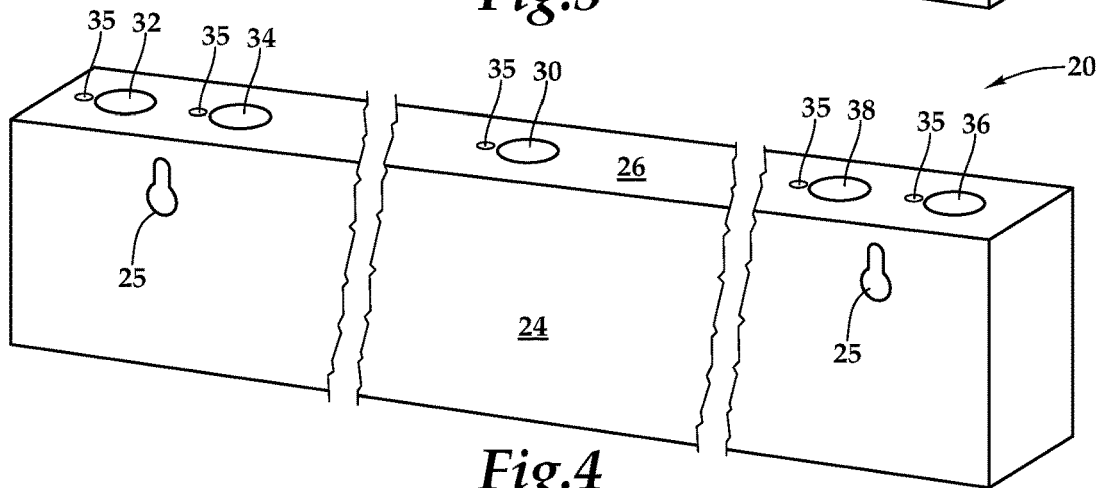
FIG. 4 is a perspective view of a rear of the bracket of FIG. 3.

More specifically, and with particular reference to FIGS. 3 and 4, particular details of the main bracket 20 are described, as one form of support base according to an exemplary embodiment of this invention. The main bracket 20 is a generally orthorhombic structure with three pairs of parallel surfaces which are mutually perpendicular to the other pairs of surfaces. These surfaces include a front plate 22 parallel with and opposite a rear plate 24, which are each oriented within vertical planes. A top plate 26 joins upper portions of the front plate 22 and rear plate 24 together.

Most preferably, the main bracket 20 is largely hollow, but is configured to have sufficient rigidity so that it can be securely mounted to a wall W (or freestanding plate 130, such as that shown in FIG. 12) and hold a mirror 50, 70, 90 at the end of an arm (such as a bar 40, 60, 80) in a secure fashion, enabling pivoting of the bars 40, 60, 80, without appreciable tilting, sagging or other undesirable movement. In one embodiment, the top plate 26 is a thick structure along with the corresponding fixed structures provided at a lowermost portion of the main bracket 20, to provide such rigid support for the bars 40, 60, 80 (see FIG. 6 and a base leg 62 of a right bar 60 where a portion of the front plate 22 of the main bracket 20 is cut away).

To facilitate mounting of the main bracket 20 to a wall W, front holes 23 pass through the front plate 22 and rear slots 25 passed through the rear plate 24. The rear slots 25 have a smaller width proportion above a larger width lower portion thereof. In this manner, a nail or screw head can be pre-attached to a wall, or attached first through the front hole 23 and then through lower portions of the rear slots 25 and into the wall W, and then the main bracket 20 can be placed onto such fasteners with heads of such fasteners engaging the upper portions of the rear slots 25, to securely hold the main bracket 20 to the fasteners and to the wall W. With such a configuration, the main bracket 20 can be lifted upwardly and then off of such fasteners, for removal of the main bracket 20 from the wall W if desired. Other forms of fasteners could alternatively be utilized with the main bracket 20 to mount the main bracket 20 to the wall W or other structures. For instance, the main bracket 20 could be built into the wall W, or could have a greater number of holes 23 and slots 25.

The bars 40, 60, 80, 100 or other arms for supporting the mirrors 50, 70, 90, 110 preferably are pivotally attached to the main bracket 20 by placement into various holes extending down through the top plate 26 into the main bracket 20. These holes include a center hole 30, a right hole 32, right center hole 34, a left hole 36 and a left center hole 38. Each of these holes is preferably similar in size and allows for different ones of the bars 40, 60, 80, 100 to be attached thereto by simply dropping in from above. In a typical embodiment, the right hole 32 supports the right bar 60, the left hole 36 supports the left bar 80, one of the right center hole 34 or the left center hole 38 supports the center bar 40, and the center hole 30 supports the top bar of 100. However, different orientations could be utilized. Typically, at least one of the holes 30, 32, 34, 36, 38 remains vacant, but an additional mirror could be provided, such as an additional top bar 100 and top mirror 110, if desired.

Each hole 30, 32, 34, 36, 38, preferably extends not only to the top plate 26, but also down through the main bracket 20 and typically is supported down through a bottom plate opposite the top plate 26 (see the base leg 62 of the right bar 60 in FIG. 6). With at least two support holes including an upper hole adjacent to the top plate 26 and a lower hole adjacent to a bottom plate opposite the top plate 26, the bars 40, 60, 80, 100 are securely held along a vertical centerline. The holes 30, 32, 34, 36, 38 also preferably include a detent recess 35 adjacent thereto in the form of a small concave recess. These detent recesses 35 are located a common distance from an adjacent hole 30, 32, 34, 36, 38 and accommodate a detent ball of a detent cartridge 155 (FIGS. 18-20) associated with a bushing 150, disclosed in detail below.

Figure 2:
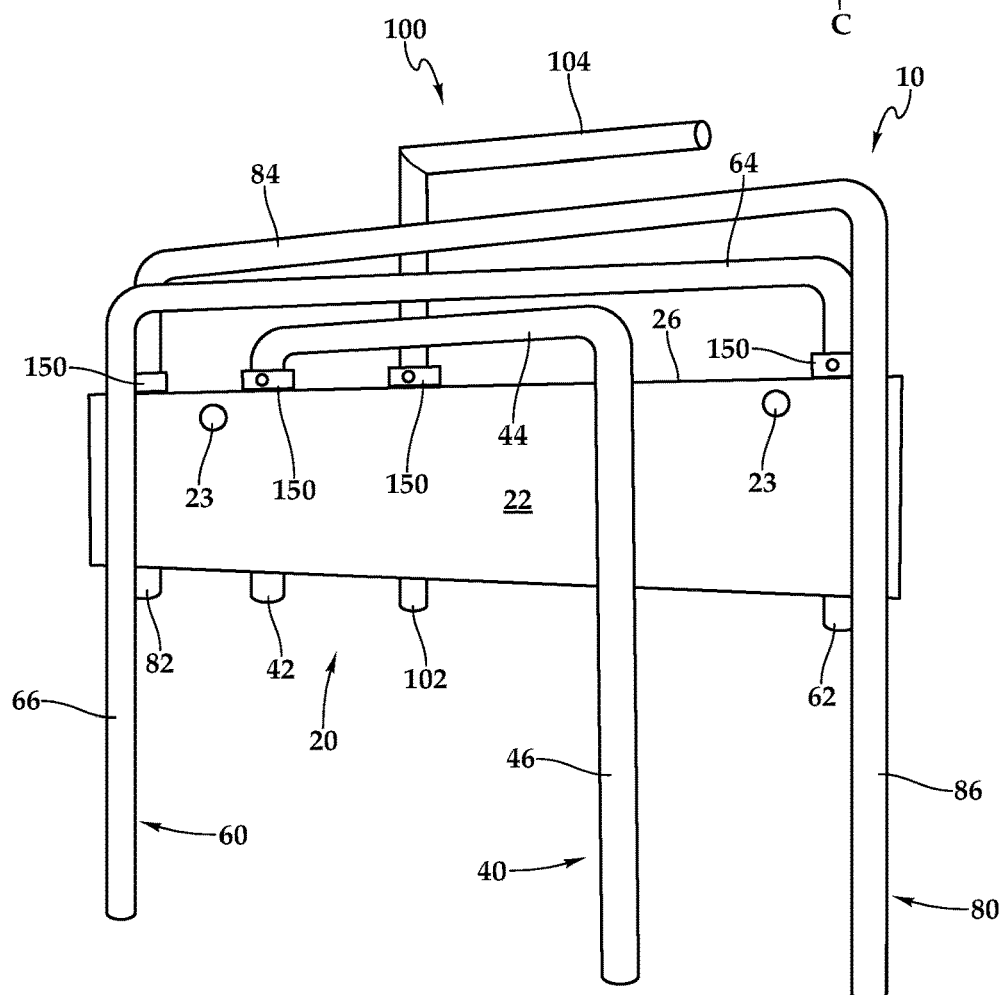
FIG. 2 is a perspective view of a main bracket portion of that which is shown in FIG. 1, and with the mirrors removed to allow the main bracket to be more easily seen, and also with various mirror support bars shown, including a top bar for supporting a top mirror associated with the main bracket.
Figure 5:
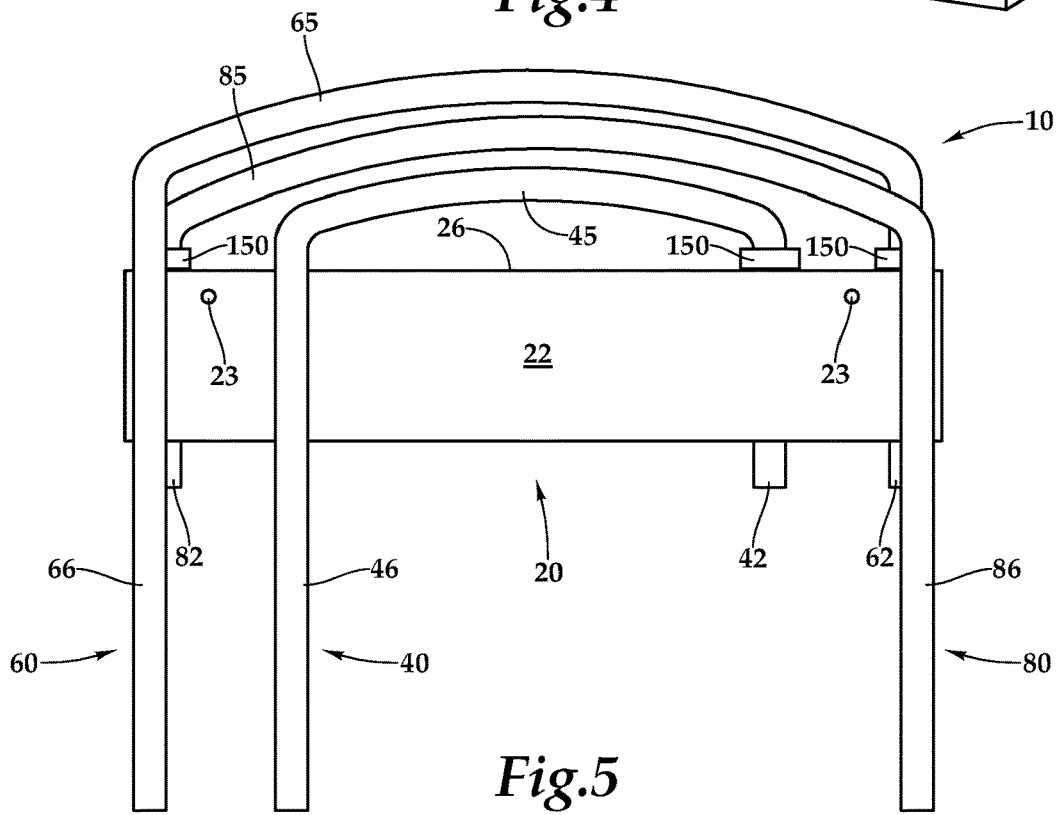
FIG. 5 is a front elevation view of an alternative embodiment of that which is shown in FIG. 2, without the top bar, and featuring bars having curved arch legs, rather than horizontal arch legs extending laterally from the main bracket to mirror mounting locations.

With particular reference to FIGS. 2 and 5, details of the bars 40, 60, 80, 100 providing a preferred form of elongate rigid arm for suspension of a mirror 50, 70, 90, 110 from the main bracket 20 or other support base, are described according to this exemplary embodiment. Each bar is preferably a rigid structure which substantially maintains its form even when loads such as those associated with the weight of a mirror are suspended from one end thereof, while the other end is held firm. Each bar 40, 60, 80, 100 includes many common features, but also is slightly different from the others in this preferred embodiment.

The center bar 40 includes a base leg 42 which extends vertically and then transitions into an arch leg 44 extending horizontally away from the base leg 42. An end leg 46 extends down from the arch leg 44 on an end thereof opposite the base leg 42. The end leg 46 is preferably parallel with the base leg 42. The arch leg 44 is preferably linear, but as an alternative can be a curved arch leg 45 (see FIG. 5). The center bar 40 has the base leg 42 supported by the main bracket 20 in an articulating fashion. The center mirror 50 pivotally attaches to the end leg 46 of the center bar 40.

Rotation of the center bar 40 relative to the main bracket 20 is depicted by arrow A (FIGS. 1 and 8). Pivoting of the center mirror 50 relative to the center bar 40 is depicted by arrow B (FIG. 8). Thus, the center bar 40 is configured to provide two degrees of freedom in the positioning and orientation of the center mirror 50 relative to the main bracket 20. A variety of positions and orientations for the center mirror 50 are thus accommodated.

In FIGS. 1 and 8, a center mirror 50 is shown facing a region X. If a countertop T or other structure blocks this area, a separate region Y can have the center mirror 50 facing that region, such as by pivoting of the center bar 40 along arrow A, as shown in FIG. 1. Such positioning allows the center mirror 50 to be spaced adjacent to a doorway D off an end of a wall W where the main bracket 20 cannot be mounted, and at a region Y where an individual can easily stand. This allows the main bracket 20 to be mounted to a lateral wall W to a lateral side of a countertop T such as that containing a sink S and faucet F, while the mirror assembly 10 can be conveniently collapsed and stored adjacent to this lateral wall W in a manner leaving the countertop T and space passing through the doorway D and the region Y generally free and unobstructed when the mirror assembly 10 is not in use.

The right bar 60 includes a base leg 62 which extends vertically and is supported by the main bracket 20, such as by passing through the right hole 32 in the main bracket 20. An arch leg 64 extends laterally away from the base leg 62. An end leg 66 is provided on an end of the arch leg 64 opposite the base leg 62. The end leg 66 is preferably vertical in orientation and parallel with the base leg 62. The arch leg 64 is preferably horizontal and perpendicular to the base leg 62 and the end leg 66, but could be a curved arch leg 65 (see FIG. 5). The right bar 60 is similar to the center bar 40, except that the arch leg 64 is longer, and typically has a length similar to a lateral width of the main bracket 20. In various embodiments, a length of the arch leg 64 could be even greater or conceivably less. Pivoting of the right bar 60 relative to the main bracket 20 is depicted by arrow C (FIGS. 1 and 8) and pivoting of the right mirror 70 relative to the right bar 60 is depicted by arrow H (FIG. 8).

The left bar 80 is similar to a right mirror 70, except that it is pivotably attached to the left hole 36 of the main bracket 20. Left bar 80 includes a base leg 82 extending vertically up to an arch leg 84 which that extends horizontally to an end leg 86 which extends vertically down from the arch leg 84. A curved arch leg 85 could optionally replace the arch leg 84 of a horizontal form. Pivoting of the left bar 80 relative to the main bracket 20 is depicted by arrow G (FIGS. 1 and 8) and pivoting of the left mirror 90 relative to the left bar 80 is depicted by arrow H (FIG. 8). Optionally, to further hold the mirrors in a collapsed position, and in a safer position for young children, a removable clamp can engage the three bars 40, 60, 80, such as at a midpoint of the arch legs 44, 64, 84 to keep the mirrors from moving unless desired. Such a clamp can have a simple inverted U-shape and straddle the bars 40, 60, 80, keeping them together and hence closed.

The top bar 100 includes a base leg 102 which extends vertically and is supported by the main bracket 20, typically supported in the center hole 30. The base leg 102 extends up to an arch leg 104 which extends horizontally away from the base leg 102. The arch leg 104 terminates before transitioning into any other leg. A swivel bracket 106 is pivotally mounted to the free tip of the arch leg 104. A pivot bracket 108 is pivotally attached to this swivel bracket 106. Fastener assemblies (such as nuts and bolts) connect this swivel bracket 106 to the arch leg 104 and the pivot bracket 108 to the swivel bracket 106.

The fastener assemblies typically include washers, and at least one of these washers is preferably in the form of a rubber washer 109 or other high friction fitting, so that when the fasteners are all tightened, pivoting of the pivot bracket 108 relative the swivel bracket 106 and pivoting of the swivel bracket 106 relative to the arch leg 104 can occur, and then hold in whatever position is selected, due to friction associated with the rubber washers 109.

The pivot bracket 108 has the top mirror 110 mounted thereto on the rear side thereof opposite to the front 112. The top mirror 110 can be swiveled from side to side (about arrow J of FIGS. 6 and 7), and the top mirror 110 can also be pivoted through the pivot bracket 108 about arrow K (FIGS. 6 and 7). Furthermore, and to add a degree of freedom to the top mirror 110 by rotation of the top bar 100 relative to the main bracket 20 through the base leg 102 within the center hole 30 (along arrow I of FIGS. 6 and 7).

With particular reference to FIGS. 1, 6, 8, 9 and 12-14, details of the mirrors are described according to this exemplary embodiment, including the center mirror 50, right mirror 70, left mirror 90 and top mirror 110. While the mirrors 50, 70, 90, 110 are similar in many respects, they also have some differences as disclosed herein. The center mirror 50 includes a front 52 opposite a rear 54. These surfaces, including the front 52 and rear 54, are parallel with each other and define a structure therebetween which typically includes a reflective layer and a transparent layer. The reflective layer can be silver, or some other reflective material, and the transparent layer can be glass, a transparent plastic, or other transparent material. Typically, a perimeter of the mirror 50 is either beveled, polished, or fitted with a frame, bumper, or other structure so that it does not provide a hard or sharp edge which could injure. A top edge 56 defines an uppermost portion of the center mirror 50.

The rear 54 of the center mirror 50 includes a pair of mounting brackets 51 thereon. Each of these mounting brackets 51 is an L-bracket including an attachment plate 53 perpendicular to a bearing plate 55. The plate 53 is attached to the rear 54 of the center mirror 50. The bearing plate 55 has a hole therein which can receive the end leg 46 of the center bar 40 passing therethrough. In particular, the bearing plate 55 includes a bearing hole 57 passing therethrough, which is sized to accommodate the end leg 46 of the center bar 40. A bushing 150 is provided upon the end leg 46 either below the lowermost of the mounting brackets 51 or below the uppermost of the mounting brackets 51.

The mounting brackets 51 can be directly mounted to the rear 54 of the center mirror 50, or can be mounted through adjustment plates which can allow for small amounts of adjustment and positioning of the attachment plate 53 of each mounting bracket 51 to the rear 54. Such fine adjustment can allow for slight changes in tilt angle of the center mirror 50 relative to the end leg 46 of the center bar 40. Such tilted adjustment can be beneficial when the center bar 40 bends slightly under the weight of the center mirror 50, or when manufacturing tolerances are not perfectly uniform, so that the mirror can still function as desired, and especially when weight is added to the center mirror 50, such as by suspension of the close-up mirror 120 (FIGS. 10 and 11) to the center mirror 50. Similar adjustment can be provided for the other mirrors 70, 90, if desired.

Figure 13:
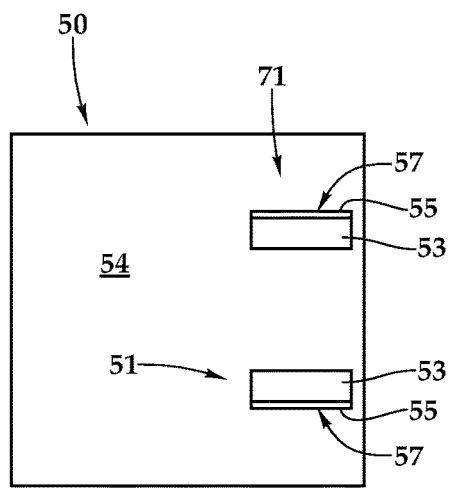
FIG. 13 is a rear elevation view of the center mirror according to one embodiment of this invention.

The mounting brackets 51 are preferably located off center on the rear 54 of the center mirror 50 (see FIG. 13). The center bar 40 preferably has its base leg 42 located within one of the right center hole 34 or the left center hole 38. Such strategic placement of the mounting brackets 51 on the rear 50 for the center mirror 50 facilitate significant lateral movement of the center mirror 50, such as that depicted along arrow A of FIG. 1 and shown in broken lines, and so that the center mirror 50 can be located either adjacent to region X or adjacent to region Y (see FIG. 1). While the center bar 40 is shown in the left center hole 38, if it is moved to the right center hole 34, the center mirror 50 can be merely rotated 180° so that the mounting brackets 51 are on the left side of the rear 54 rather than on the right side of the rear 54, as shown in FIG. 13.

The right mirror 70 and left mirror 90 are similar in form, but can be rotated 180° if desired for optimal positioning thereof. The right mirror 70 includes a front 72 opposite a rear 74 and with an uppermost portion defined by a top edge 76. The left mirror 90 includes a front 92 opposite a rear 94, and with a top edge 96 defining an uppermost portion of the left mirror 90. The top edges 76, 96 are preferably substantially aligned with the top edge 56 of the center mirror 50.

Figure 14:
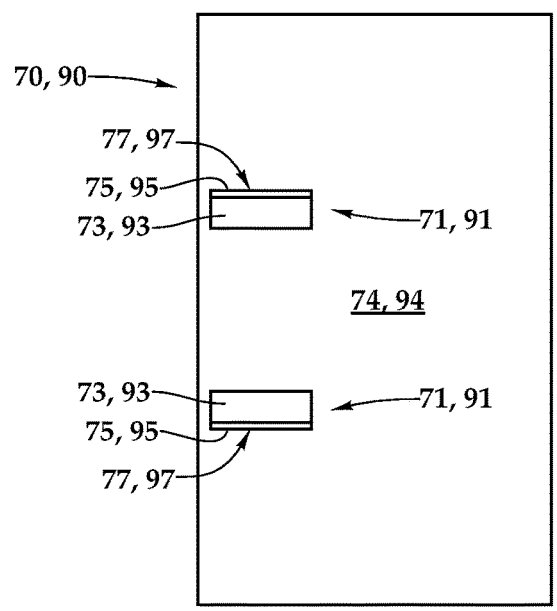
FIG. 14 is a rear elevation view of a right mirror or left mirror according to one embodiment of this invention.
Figure 15:
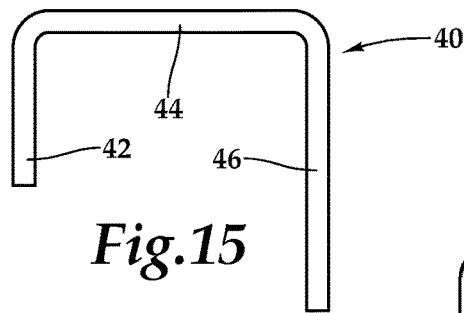
FIG. 15 is a front elevation view of a center bar for supporting a center mirror of this invention according to one embodiment.
Figure 16:
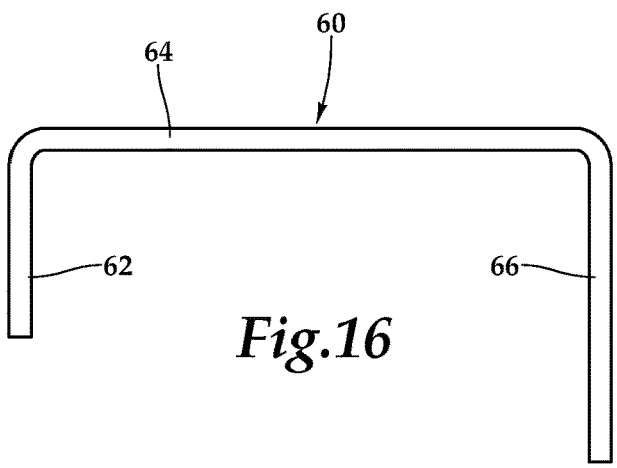
FIG. 16 is a front elevation view of a right bar for supporting a right mirror of this invention according to one embodiment.

As depicted in FIG. 14, a pair of mounting brackets 71, 91 are associated with each of the mirrors 70, 90. Each of these brackets 71, 91 includes an attachment plate 73, 93, and a bearing plate 75, 95 with a bearing hole 77, 97 passing therethrough. Details of these mounting brackets 71, 91 match details of the mounting brackets 51 associated with the center mirror 50. These mounting brackets 71, 91 are offset laterally (see FIG. 14) and can be rotated 180° for positioning of these mounting brackets 71, 91 either at a left edge or a right edge. Typically, the left mirror 90 has its mounting brackets 91 located at the left side of the rear 94 thereof, while the right mirror 70 has the mounting bracket 71 located at a right edge of the rear 74 of the right mirror 70. While the brackets 51, 71, 91 typically are oriented with their bearing plates 55, 75, 95 adjacent to each other, they could be oriented differently, such as is shown with the left mirror 90 and its brackets 91 in FIG. 6.

The top mirror 110 has a front 112 opposite a rear, and with a general form similar to that of the mirrors 50, 70, 90, but typically somewhat smaller. A rear of the top mirror 110 opposite the front 112 attaches to the pivot bracket 108.

With particular reference to FIGS. 10 and 11, details of a close-up mirror 120, providing one form of auxiliary mirror attachable to one of the other mirrors 50, 70, 90, are described according to this exemplary embodiment. The close-up mirror 120 includes a concave reflector 125 surrounded by a frame 127. This concave reflector 125 is typically circular in form and concave, so that it enlarges items, and especially items near a focal length of this concave mirror. This close-up mirror 120 is conveniently connected to the mirror assembly 10 through support arm 122 in the form of a rigid bar bent into a particular shape to facilitate such removable attachment.

In particular, the support arm 122 has a dip 124 strategically located between a pair of saddles 126 and then extends down to opposing pivot tips 128, where the frame 127 of the concave reflector 125 pivotally attaches to the support arm 122. The saddles 126 can straddle one of the top edges 56, 76, 96 of one of the mirrors 50, 70, 90, while the dip 124 is on a rear side of the mirror 50, 70, 90 and a remainder of the support arm 122 is located on a front side of the mirror 50, 70, 90. The support arm 122 can have padding at least at strategic locations where it contacts the mirror and/or the rear of the mirror, to protect the mirror and to provide a more secure mounting of the close-up mirror 120 to the adjacent mirror 50, 70. The concave reflector 125 and frame 127 can pivot (about arrow L of FIG. 10) to pivot out of a vertical plane if desired. The close-up mirror 120 can be removed if desired, or move from one mirror 50, 70, 90 to a different mirror 50, 70, 90 as desired by a user, by merely lifting upward until the close-up mirror 120 is off of the mirror 50, 70, 90, and then lowering it downward over a different top edge 56, 76, 96 have a different mirror 50, 70, 90, for relocating the close-up mirror 120.

With particular reference to FIG. 12, details of a freestanding plate 130 for supporting a main bracket 20 other than upon a wall W are described, according to this exemplary embodiment. The freestanding plate 130 is an elongate rigid structure having an upper end 132 opposite a lower end 134. Fasteners 136 allow the freestanding plate 130 to attach to a rear N of an item of furniture M, such as a dresser. An angle bracket 140 includes a vertical plate 142 secured to the freestanding plate 130 between the ends 132, 134. A horizontal plate 144 extends perpendicularly from the vertical plate 142 and can rest upon a top surface of the item of furniture M. Gussets 146 extend perpendicularly to both the freestanding plate 130 and the horizontal plate 144 to further support the angle bracket 140 relative to the freestanding plate 130. With such a configuration, the mirror assembly 10 can be positioned in a location where a wall W is not available for mounting or attachment to furniture is more desirable.

Figure 18:
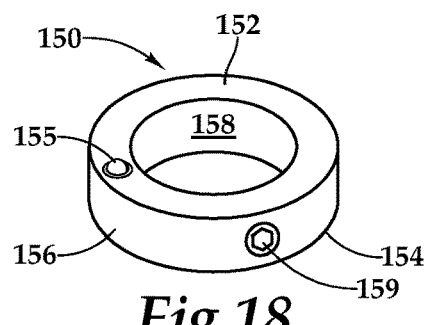
FIG. 18 is a perspective view of a bushing for use in positioning the bars relative to the main bracket, or the mirrors relative to the bars, and showing position of a set screw and detent ball cartridge within the bushing.
Figures 19, 20:
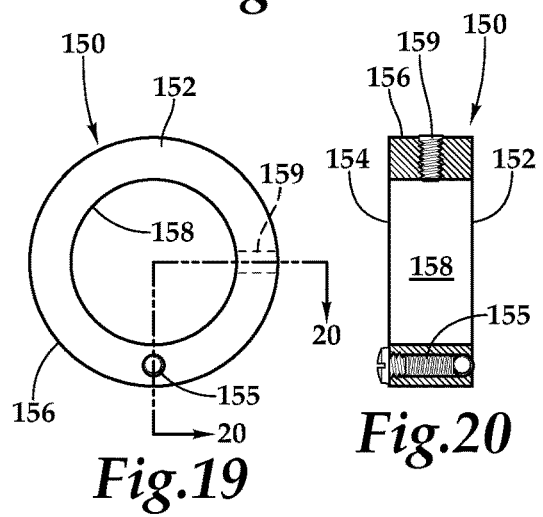
FIG. 19 is a top plan view of that which is shown in FIG. 18.
FIG. 20 is a side elevation sectional view of the bushing shown in FIGS. 18 and 19, and with the section taking along lines 20-20 of FIG. 19.
Figure 17:
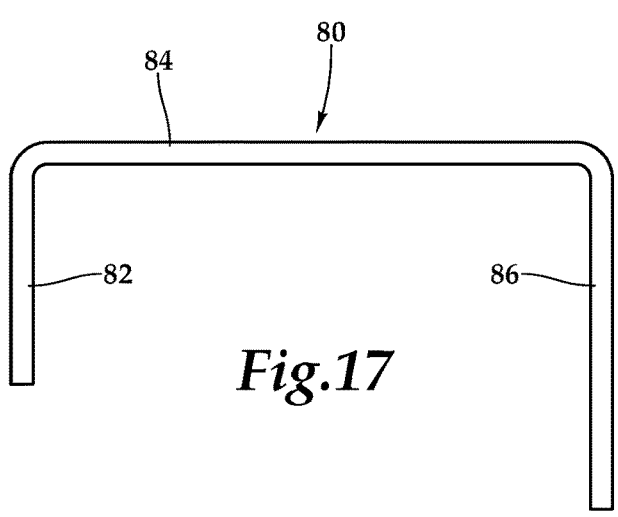
FIG. 17 is a front elevation view of a left bar for supporting a left mirror of this invention according to one embodiment.

With particular reference to FIGS. 18-20, details of the bushing 150 are described according to this exemplary embodiment. Optionally, the bushing 150 has a similar form regardless of where it is located, and whether it is holding a bar 40, 60, 80, 100 adjacent to the top plate 26 of the main bracket 20, or if it is holding one of the mounting brackets 51, 71, 91 of one of the mirrors 50, 70, 90 onto one of the bars 40, 60, 80. The bushing 150 is generally in the form of a collar having a flat face edge 152 parallel and opposite a flat rear edge 154, and with concentric surfaces including an outer wall 156 opposite an inner wall 158.

A detent cartridge 155 extends between the face edge 152 and the rear edge 154. The detent cartridge 155 is configured to fit within a pre-existing hole and to have a detent ball extending out of the face edge 152 while a mounting screw on an opposite side of the detent cartridge 155 is adjacent to and fastens to the rear edge 154. This detent cartridge 155 includes a spring therein which biases the detent ball extending out of the face edge 152 slightly (see FIG. 18). However, the detent ball can be pushed into the face edge 152 (see FIG. 20) if sufficient forces are applied thereto, through compression of the spring behind the detent ball.

A setscrew 159 extends between the inner wall 158 and the outer wall 156. The setscrew 159 rotates within a threaded hole, so that the setscrew can be tightened and dig into a portion of one of the bars 40, 60, 80, 100. The bushing 150 can be positioned where desired first, and then the setscrew 159 can be tightened to lock the bushing 150 in this desired position. If one of the bars 40, 60, 80 or one of the mirrors 50, 70, 90 is not positioned where desired, the setscrew 159 can be loosened, the bushing 150 moved somewhat, and the setscrew 159 retightened to properly position these structures where desired.

Such proper positioning of each bushing 150 includes both elevation positioning of each bushing 150 along vertical portions of the bars 40, 60, 80, 100, and also rotational positioning of the bushing 150 so that the detent cartridge 155 is positioned precisely where desired. In particular, the detent cartridge 155 is aligned with one of the detent recesses 35 (see FIG. 3) when the associated bar 40, 60, 80, 100 is in a most desirable position. In this way, all the bars 40, 60, 80, 100 can be freely rotated so that they tend to "snap" into a most desirable position when the detent ball of the detent cartridge 155 drops into an associated detent recess 35. In a similar manner, mounting brackets 51, 71, 91 can include detent recesses therein which can cooperate with the detent balls associated with the detent cartridge 155 of each bushing 150 so that a most desired orientation for each mirror 50, 70, 90 can be readily reselected by an individual. The bushings 150 can be pre-installed to a factory installation position which is considered to be optimal for many users. However, different furniture arrangements, room configurations, and individual preferences can prompt a user to tune the bushings 150 by loosening the setscrews 159, rotating the bushings 150 to a new position that is more desirable, and then retightening the setscrew 159. While the bushings 150 are generally shown adjacent to the lower mounting brackets 51, 71, 91 on the rear surfaces of the mirrors 50, 70, 90, an alternative is to place the bushing 150 adjacent to the top mounting bracket 51, 71, 91, such as is depicted with the alternate bushing location 160 in FIG. 6.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. An articulating mirror assembly, comprising in combination:
    a support base;
    a first mirror suspended from said support base;
    a second mirror suspended from said support base;
    at least one elongate rigid arm located between said second mirror and said support base, said second mirror suspended from said support base by said at least one elongate rigid arm in a movable fashion;
    said at least one elongate rigid arm pivotally attached adjacent a first end to said support base and pivotally attached to said second mirror at a portion of said arm spaced from said first end; and
    an overhead portion of said arm between said first end and said second mirror, said overhead portion of said arm located higher than a majority of said second mirror.

2. The assembly of claim 1 wherein said first mirror and said second mirror are oriented in planes closer to vertical than to horizontal, said overhead portion located over a top edge of at least a portion of said second mirror.

3. The assembly of claim 2 wherein said overhead portion of said elongate rigid arm extends horizontally.

4. The assembly of claim 2 wherein said elongate rigid arm includes said first end extending vertically through at least one hole in said support base, said first end of said arm pivotally supported relative to said support base by said hole, said arm including a vertical second end opposite said first end, said overhead portion located between said vertical second end of said arm and said first end said arm, said vertical second end pivotally mounted to said second mirror.

5. The assembly of claim 4 wherein said second mirror includes two brackets on a rear surface thereof, each of said brackets including holes which pass therethrough which are aligned with each other along a line which said vertical second end of said at least one elongate rigid arm extends, for pivotally mounting said vertical second end of said arm to said second mirror.

6. The assembly of claim 5 wherein a bushing is affixed to said first end of said at least one elongate rigid arm, said bushing in abutment with an upper portion of said support base, and with a bushing affixed to said vertical second end of said at least one elongate rigid arm in abutment with one of said brackets on said rear surface of said mirror, each said bushing being similar in form and including a detent ball biased toward a position extending away from said bushing and toward an adjacent surface abutting said bushing, and wherein said adjacent surface includes a recess therein into which said detent ball can reside when said elongate rigid arm is in a pre-defined desired orientation.

7. The assembly of claim 1 wherein a third mirror is suspended from said support base with at least one further elongate rigid arm pivotally attached between said support base and said third mirror, said further elongate rigid arm located higher than said at least one elongate rigid arm between said second mirror and said support base.

8. The assembly of claim 1 wherein a first mirror arm is located between said first mirror and said support base, said first mirror arm located at a different elevation than the at least one elongate rigid arm between said second mirror and said support base.

9. The assembly of claim 1 wherein a top mirror is suspended from said support base through a top mirror bar pivotally supported within a center hole which extends vertically into said support base and with said top mirror bar located between said support base and said top mirror, said top mirror pivotally mounted to said top mirror bar to both facilitate pivot about a vertical axis and tilt about a horizontal axis.

10. A method for viewing multiple sides of a person simultaneously by that person, the method including steps of:
    suspending a multiple mirror assembly adjacent to a location where a person can be positioned, the mirror assembly including a support base, a first mirror suspended from the support base, a second mirror suspended from the support base, at least one elongate rigid arm extending between the second mirror and the support base and suspending the second mirror from the support base in a movable fashion, the at least one elongate rigid arm pivotally attached adjacent a first end to the support base and pivotally attached to the second mirror at a portion of the arm spaced from the first end, and an overhead portion of the arm between the first end and the second mirror, the overhead portion of the arm located higher than a majority of the second mirror; and
    locating the person between the first mirror and the second mirror with each mirror facing the person and with the overhead portion of the at least one elongate rigid arm at least partially extending over the person.

11. The method of claim 10 wherein said suspending step includes mounting the support base to a substantially vertical wall adjacent to the location where the person can be positioned.

12. The method of claim 11 wherein said suspending step includes mounting the support base to a portion of a wall located over a countertop, the first mirror suspended from a first mirror arm extending between the first mirror and the support base, the additional arm long enough to allow the first mirror to be positioned at a location which is not over the countertop and with the second mirror also not located over the countertop, such that the first mirror and the second mirror can be both used by the person with the person positioned at a location spaced from the countertop.

13. The method of claim 10 wherein said suspending step includes the mirror assembly having a third mirror suspended from the support base with at least one further elongate rigid arm pivotally attached between the support base and the third mirror, the further elongate rigid arm located higher than the at least one elongate rigid arm between the second mirror and the support base; and
   collapsing the second mirror and the third mirror against the support base with the second mirror and the third mirror substantially covering the first mirror and with the second mirror and the third mirror adjacent to each other.

14. The method of claim 10 including the further step of hanging an auxiliary mirror from a mirror taken from the group of mirrors including the first mirror and the second mirror, the auxiliary mirror having a concave reflective surface.

15. The method of claim 10 wherein said suspending step includes the mirror assembly having a top mirror suspended from the support base through a top mirror bar pivotally supported with a center hole extending vertically into the support base and with the top mirror bar located between the support base and the top mirror, the top mirror pivotally mounted to the top mirror bar in a manner both pivoting about a vertical axis and tilting about a horizontal axis.

16. The method of claim 10 wherein said suspending stop includes the overhead portion extending over a top edge of at least a portion of the second mirror.

17. The method of claim 16 wherein said suspending step includes the overhead portion of the elongate rigid arm extending horizontally.

* * * * *